No. 664,023. Patented Dec. 18, 1900.
P. MARINO.
ELECTRIC ACCUMULATOR.
(Application filed June 23, 1899.)
(No Model.)

WITNESSES
Ella L. Giles

INVENTOR
Pascal Marino
BY
ATTORNEYS

UNITED STATES PATENT OFFICE.

PASCAL MARINO, OF BRUSSELS, BELGIUM.

ELECTRIC ACCUMULATOR.

SPECIFICATION forming part of Letters Patent No. 664,023, dated December 18, 1900.

Application filed June 23, 1899. Serial No. 721,647. (No specimens.)

*To all whom it may concern:*

Be it known that I, PASCAL MARINO, chemist, of No. 77 Rue des Foulons, Brussels, in the Kingdom of Belgium, have invented a new and useful Improvement in Electric Accumulators, of which the following is a specification.

This invention relates to a new electric accumulator essentially characterized by the nature, construction, and formation of its electrodes and its electrolyte.

The invention is illustrated in the accompanying drawings, in which—

Figure 2:
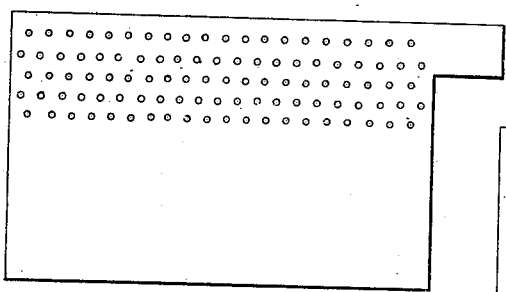
Figure 1:
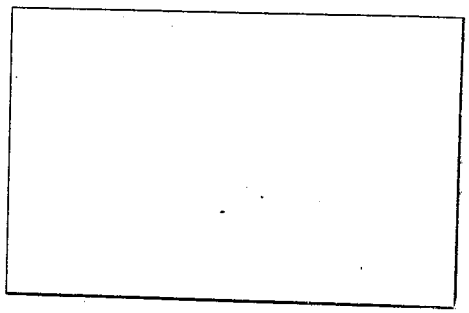
Figure 3:
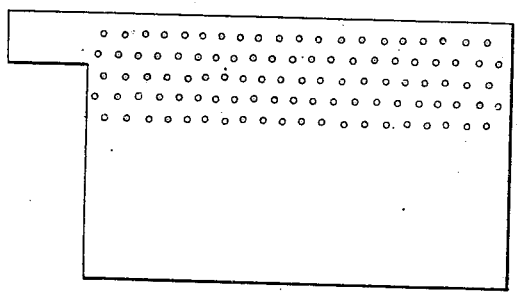
Figure 4:
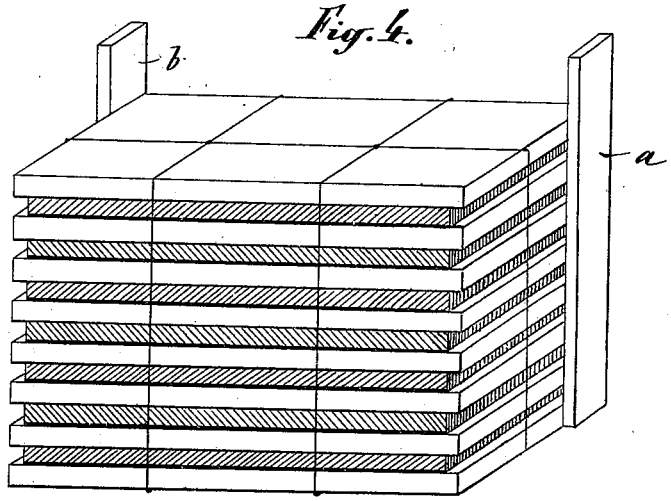

Figure 1 is a plan view of one of the separating-partitions. Figs. 2 and 3 are similar views of the electrodes, and Fig. 4 is a perspective view of the accumulator.

Each element consists of one or more negative or positive electrodes, made as follows:

First. Each positive electrode is a thin sheet of lead flat or corrugated and preferably perforated with numerous holes. It is covered by a brush with one or more successive layers of active material consisting either entirely of minium or of a mixture of lead minium finely pulverized and graphite. In order to render the active material fluid and adherent, it is mixed with a liquid consisting of about ten grams of dry guncotton introduced into a deep vessel and having poured on it distilled water enough to cover the cotton. To this are added about fifty-five grams of caustic soda or potash. The caustic salt in dissolving heats the liquid, which in some places turns yellow. The guncotton decomposes and completely disappears by the reaction which it undergoes. On completion of the action a liquid of deep-brown color is obtained, to which is added benzene, the object of which is to clear off the fatty matters which may be on the metal and also to render the material more adherent. The whole being mixed with the active material is applied by a brush to the lead sheets.

Second. Each negative electrode consists of a flat or corrugated sheet, which may be perforated or not, of lead, aluminium, or other metal covered like the positive electrode, but with litharge instead of minium.

Third. Porous rigid partitions of asbestos or magnesive paste or of unglazed porcelain or of other porous rigid material separate the positive from the negative electrode.

Fourth. For conductors each electrode, as shown in plan in Figs. 2 and 3, has a projecting lug on one side and all the lugs of the electrodes of the same sign positive on the one side and negative on the other side.

Fifth. The complete element, which may be square or rectangular, according to the shape of the plates, thus consists, as shown in Fig. 4, of a number of horizontal positive and negative electrodes superposed and alternating and separated by the porous partitions described under three, the whole stiffened by soldering to the lugs two bars $a$ and $b$, which constitute the conductors. The whole pile is bound solidly together by ties that are not attacked by acids and are not conductors.

It might be thought that the porous partitions cause internal resistance; but this is not the case, for as soon as circuit is completed the accumulator yields current like ordinary accumulators. For instance, if a kilogram of electrodes having at least five plates be placed in the forming-bath, consisting of double sulfate of lead and ammonia, hereinafter described, meters indicate after about ten hours' formation about two and one-half volts and ten to twelve amperes, which is the best proof that the lead oxid is reduced to active material.

Sixth. The electrolyte liquid consists of distilled or rain water with addition of phosphoric or phosphatic acid or phosphorous or phosphoglyceric acid, or, briefly, any acid resulting from the combination of phosphorus and oxygen. It has been ascertained that during discharge of the elements the reduction of the lead peroxid occurred in an incomplete manner, and consequently that the presence of peroxids in the electrolyte caused an opposing electromotive force, which explained irregularities of charge and discharge. This defect is avoided by adding to the electrolyte drops of hypophosphorous acid, which has the effect of rendering the reduction of lead peroxid complete and gradual during discharge.

Seventh. For forming the elements I proceed as follows: In a special receptacle the electrodes are arranged insulated from each other and connected alternately to the positive and negative terminals of a source of electricity in a forming electrolyte, consisting of a solution of sucroglycerate of calcium or of barium or strontium. By the electric action there is obtained a layer of lead binoxid, formed from the pure-lead covering of the positive electrode, and the negative electrode becomes modified, assuming a granular condition very favorable to the chemical action which should take place in the accumulator.

In order to accelerate the forming, the electrodes are in the first place passed through an electrolyte consisting of a solution of double sulfate of lead and ammonia, which is obtained by precipitating lead acetate by sulfuric acid and saturating the acid with ammonia. Under the action of an electric current of at least two volts the positive electrodes become covered with a deposit of lead peroxid and the negative with a deposit of spongy lead.

The advantage of the system described over other known systems are numerous, the chief being as follows: The output in capacity is greater without increase of the specific capacity, (weight and volume). The use of two porous partitions within the envelop gives it such a rigidity that movements causing short circuit cannot take place. The solidity of the electrodes allows of increased charge and greater output. The protection of the active material by the porous partitions renders falls of it impossible whatever be the shocks or vibrations to which the elements are subjected. The formation being very rapid, the discharge is obtained immediately on closing circuit.

Having thus described my invention, I claim as my entire and exclusive property the nature, construction, and formation of the electrodes of my new accumulator, which consists of—

The process described consisting in adding to an active material comprising lead oxid a liquor composed of distilled water, guncotton, caustic alkali and benzene for the purpose of obtaining adhesion to the electrodes, forming the electrodes so composed first in a solution of bisulfate of lead and ammonia then in a solution of sucroglycerate of an alkaline earth metal.

In witness whereof I have hereunto set my hand in presence of two witnesses.

PASCAL MARINO.

Witnesses:
UBERT DROIPON,
ED. THOLINET.